(12) United States Patent
Park et al.

(10) Patent No.: US 9,430,803 B2
(45) Date of Patent: Aug. 30, 2016

(54) METHOD FOR EXCHANGING INFORMATION BY USING SMART GRID IN UPNP

(75) Inventors: Ho-Yeon Park, Seoul (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 1172 days.

(21) Appl. No.: 13/335,026

(22) Filed: Dec. 22, 2011

(65) Prior Publication Data

US 2012/0166537 A1    Jun. 28, 2012

(30) Foreign Application Priority Data

Dec. 22, 2010    (KR) .................. 10-2010-0132415

(51) Int. Cl.
| | | |
|---|---|---|
| *G06F 15/16* | (2006.01) | |
| *G06F 15/177* | (2006.01) | |
| *G06Q 50/06* | (2012.01) | |
| *G06Q 10/06* | (2012.01) | |

(52) U.S. Cl.
CPC .............. *G06Q 50/06* (2013.01); *G06Q 10/06* (2013.01); *Y04S 10/60* (2013.01)

(58) Field of Classification Search
CPC ...... G06Q 10/06; G06Q 10/60; G06Q 50/06; H04L 12/10; H04L 12/12; H04L 12/2803; H04L 12/2818; H04L 12/2835; H04L 12/2834; H04L 41/0833; H04L 61/1511; H04L 61/2015; H04L 61/2076; H04L 67/16; H04L 67/18; H04L 63/08; H04L 63/0853; H04L 63/0869; G08C 2201/21; G08C 2201/30; G08C 2201/40; G08C 2201/50; G08C 2201/70; G08C 2201/92; G08C 2201/93

USPC ........ 709/203–204, 206, 219–221, 223–225, 709/230, 232

See application file for complete search history.

(56) References Cited

U.S. PATENT DOCUMENTS

| | | | | |
|---|---|---|---|---|
| 2008/0034081 | A1* | 2/2008 | Marshall | ................ G08C 17/02 709/223 |
| 2008/0301293 | A1* | 12/2008 | Jung | ................... H04L 41/0809 709/224 |
| 2008/0316941 | A1 | 12/2008 | Jung et al. | |
| 2009/0018677 | A1 | 1/2009 | Jung et al. | |
| 2010/0042233 | A1 | 2/2010 | Han et al. | |
| 2010/0217549 | A1 | 8/2010 | Galvin et al. | |

(Continued)

FOREIGN PATENT DOCUMENTS

KR    100963161    6/2010

OTHER PUBLICATIONS

Gianluca Dini and Marco Tiloca, "Considerations on Security in ZigBee Networks", Jun. 2010, IEEE computer society, pp. 58-65.*

(Continued)

*Primary Examiner* — Farzana Huq
(74) *Attorney, Agent, or Firm* — The Farrell Law Firm, P.C.

(57) ABSTRACT

A system for performing information exchange by using a Smart Grid (SG) is provided. The system includes a first device and a second device having SG service types; and an SG Control Point (CP) for transmitting an SG capability request message to the first device and the second device, receiving SG capability response messages from the first device and the second device, matching function sets of the same type to one another if the function sets of the same type are included in the received SG capability response messages from the first device and the second device, and connecting the first device and the second device to one another for the information exchange.

15 Claims, 5 Drawing Sheets

(56) References Cited

U.S. PATENT DOCUMENTS

| | | | |
|---|---|---|---|
| 2010/0250590 A1* | 9/2010 | Galvin | G06F 1/3203 707/770 |
| 2011/0077878 A1* | 3/2011 | Lathrop | H02J 13/0003 702/62 |
| 2011/0194539 A1* | 8/2011 | Blasinski | H04W 72/1252 370/336 |
| 2012/0016528 A1* | 1/2012 | Raman | G06F 9/5094 700/291 |
| 2012/0053740 A1* | 3/2012 | Venkatakrishnan et al. | 700/291 |

OTHER PUBLICATIONS

Gianluca dini and Marco Tiloca, "Considerations on Security in ZigBee Networks". Jun. 2010, IEEE computer society, pp. 58-65.*

Alan Messer: "UPnP Certified Technology—Your Simple Solution for Home, Office and Small Business Interoperability", XP 002723689, Sep. 30, 2010.

"UPnP and the SmartGrid", UPnP Forum Smart Grid Task Force, EPRI Presentation, Apr. 8, 2010.

* cited by examiner

METHOD FOR EXCHANGING INFORMATION BY USING SMART GRID IN UPNP

PRIORITY

This application claims priority under 35 U.S.C. §119(a) to a Patent Application filed in the Korean Intellectual Property Office on Dec. 22, 2010 and assigned Serial No. 10-2010-0132415, the entire disclosure of which is incorporated herein by reference.

BACKGROUND OF THE INVENTION

1. Field of the Invention

The present invention relates generally to Universal Plug and Play (UPnP), and more particularly, to a method for exchanging information between two devices in real-time in UPnP.

2. Description of the Related Art

Generally, a home network is a private network based on Internet Protocol (IP), and connects any type of a Personal Computer (PC) used at home and various devices, such as intelligent products, wireless devices, and the like, to one network, and controls that network via a common virtual computing environment called middleware.

Middleware enables communication between various digital devices by connecting the digital devices by using a peer-to-peer method. Examples of middleware include Home AV Interoperability (HAVI), a Universal Plug and Play (UPnP) control device, a Java Intelligent Network Infrastructure (JINI), a Home Wide Web (HWW), and so forth.

In a computing environment established through the UPnP middleware, each device is allocated an address according to the Dynamic Host Configuration Protocol (DHCP), or is allocated an address selected by the Automatic IP-specifying function (Auto IP), through which communication is performed.

The UPnP network is a home-network technology, which defines the UPnP device and the UPnP service, and is defined by the protocol between them. The UPnP network is constituted by a Controlled Device (CD), which is a home-network device connected to and controlled by the home network, and a Control Point (CP), which is a device for controlling such a CD. The CP controls the CD, and requests and receives events. The CD performs specified functions according to the request of the CP, and when the state of the CD is changed, the CD sends the event to the CP that has requested the event.

Smart grid technology, provides integration technology into an existing home network power net to allow a power provider and a consumer to exchange real-time information interactively. The smart grid is a next-generation functional grid, which optimizes energy efficiency because the power provider and the consumer interactively communicate with one another by using the existing grid.

Currently, as a leader of standard technologies of in-home smart grid, the Zigbee® Smart Energy Profile (SEP) 2.0 technology is used. The Zigbee® SEP 2.0 technology is a lightweight profile based on REpresentational State Transfer (REST), and operates on the HyperText Transfer Protocol (HTTP). The Zigbee® SEP 2.0 technology defines a data model, a REST-based Uniform Resource Identifier (URI), a device type, a function set, and the like.

However, in the current UPnP network, a technique for interactively exchanging real-time information by using an existing grid as in the smart grid is not applied. Therefore, there is a need for a technique for exchanging information on a real-time basis by using an existing UPnP network grid.

SUMMARY OF THE INVENTION

The present invention includes a method for exchanging information between two or more devices on a real-time basis by using the Zigbee® SEP 2.0 technology of a smart grid in an existing UPnP network.

According to an aspect of the present invention, a method for exchanging information by using a Smart Grid (SG) is provided. The method includes transmitting, by an SG Control Point (CP), an SG capability request message to a first device and a second device; receiving SG capability response messages from the first device and the second device; determining whether function sets of a same type are included in the received SG capability response messages from the first device and the second device; matching the function sets of the same type to one another; and connecting the first device and the second device to one another.

According to another aspect of the present invention, a system for performing information exchange by using a Smart Grid (SG) is provided. The system includes a first device and a second device having SG service types; and an SG Control Point (CP) for transmitting an SG capability request message to the first device and the second device, receiving SG capability response messages from the first device and the second device, matching function sets of the same type to one another if the function sets of the same type are included in the received SG capability response messages from the first device and the second device, and connecting the first device and the second device to one another for the information exchange.

According to another aspect of the present invention, an apparatus for performing information exchange by using a Smart Grid (SG) is provided. The apparatus includes a transmitter for transmitting an SG capability request message to a first device and a second device; a receiver for receiving SG capability response messages from the first device and the second device; a controller for determining whether function sets of the same type are included in the received SG capability response messages from the first device and the second device, and matching the function sets of the same type to one another; and a connector for connecting the first device and the second device to one another.

BRIEF DESCRIPTION OF THE DRAWINGS

The above and other aspects, features and advantages of an embodiment of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. Throughout the drawings, the same elements will be designated by the same reference numerals.

Figure 1:
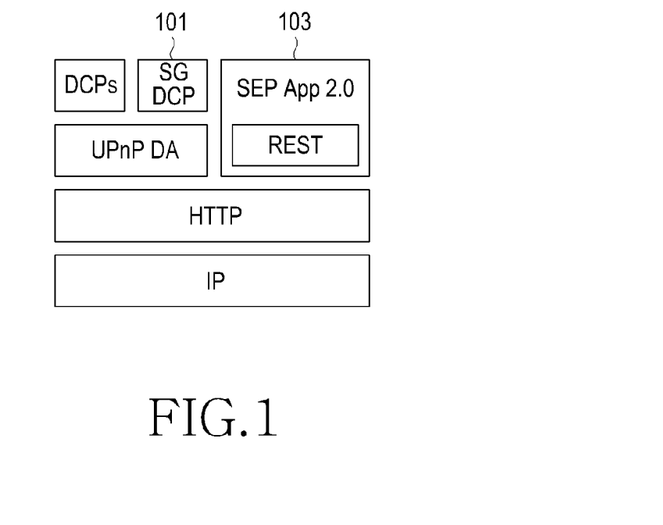
FIG. 1 is a diagram illustrating Universal Plug and Play (UPnP) to which Zigbee® Smart Energy Profile (SEP) 2.0 of a smart grid is applied according to an embodiment of the present invention.

FIG. 1 is a diagram illustrating Universal Plug and Play (UPnP) to which Zigbee® Smart Energy Profile (SEP) 2.0 of a smart grid is applied according to an embodiment of the present invention.

Referring to FIG. 1, Representational State Transfer (REST)-based Zigbee® SEP 2.0 103 is reflected in an existing UPnP configuration, and a Smart Grid (SG) Diagnostic Control Program (DCP) 101 for controlling the Zigbee® SEP 2.0 103 is generated on a UPnP configuration basis. Thus, devices operating in UPnP include the Zigbee® SEP 2.0 103 and the SG DCP 101.

Figure 2:
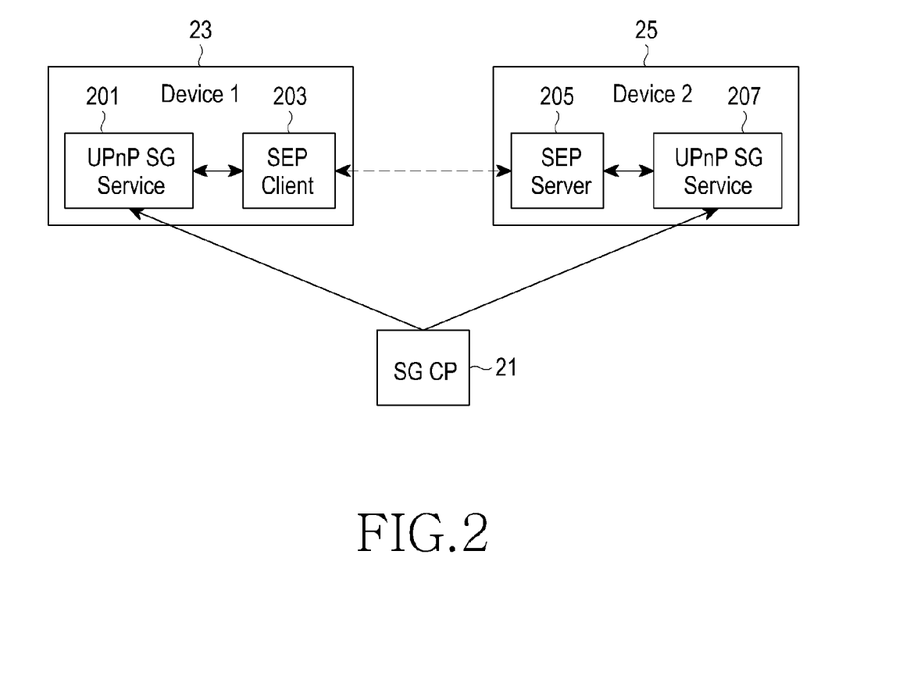
FIG. 2 is a diagram illustrating a UPnP network system to which Zigbee® SEP 2.0 is applied according to an embodiment of the present invention.

FIG. 2 is a diagram illustrating an UPnP network system to which Zigbee® SEP 2.0 is applied according to an embodiment of the present invention. The system shown in FIG. 2 includes an SG Control Point (CP) 21, a first device 23, and a second device 25.

Referring to FIG. 2, the first device 23 and the second device 25 have their respective UPnP SG service modules 201 and 207, and the SG CP 21 performs a control operation between the first device 23 and the second device 25 to enable communication between them. The SG CP 21 first discovers the first device 23 and the second device 25 which have the SG service modules 201 and 207, respectively, and connects the first device 23 and the second device 25 to one another. When connecting them, the SG CP 21 analyzes types included in the first device 23 and the second device 25, and matches function sets included in the types to one another. The first device 23 and the second device 25, upon being connected to one another, serve as a client and a server to transmit and receive information to one another. For transmission and reception of information, the first device 23 uses an SEP client module 203, and the second device 25 uses an SEP server module 205. That is, by matching of the function sets, the first device 23 serves as a client and the second device 25 serves as a server.

The SG CP 21 may include a transmitter for an SG capability request message to the first device 23 and the second device 25 having the same SG service type, a receiver for receiving respective SG capability response messages from the first device 23 and the second device 25, a controller for determining whether function sets of the same type are included in the received SG capability response messages and matching the function sets of the same type to one another, and a connector for connecting the first device 23 and the second device 25, although those components of the SG CP 21 are not shown in FIG. 2.

Figure 3:
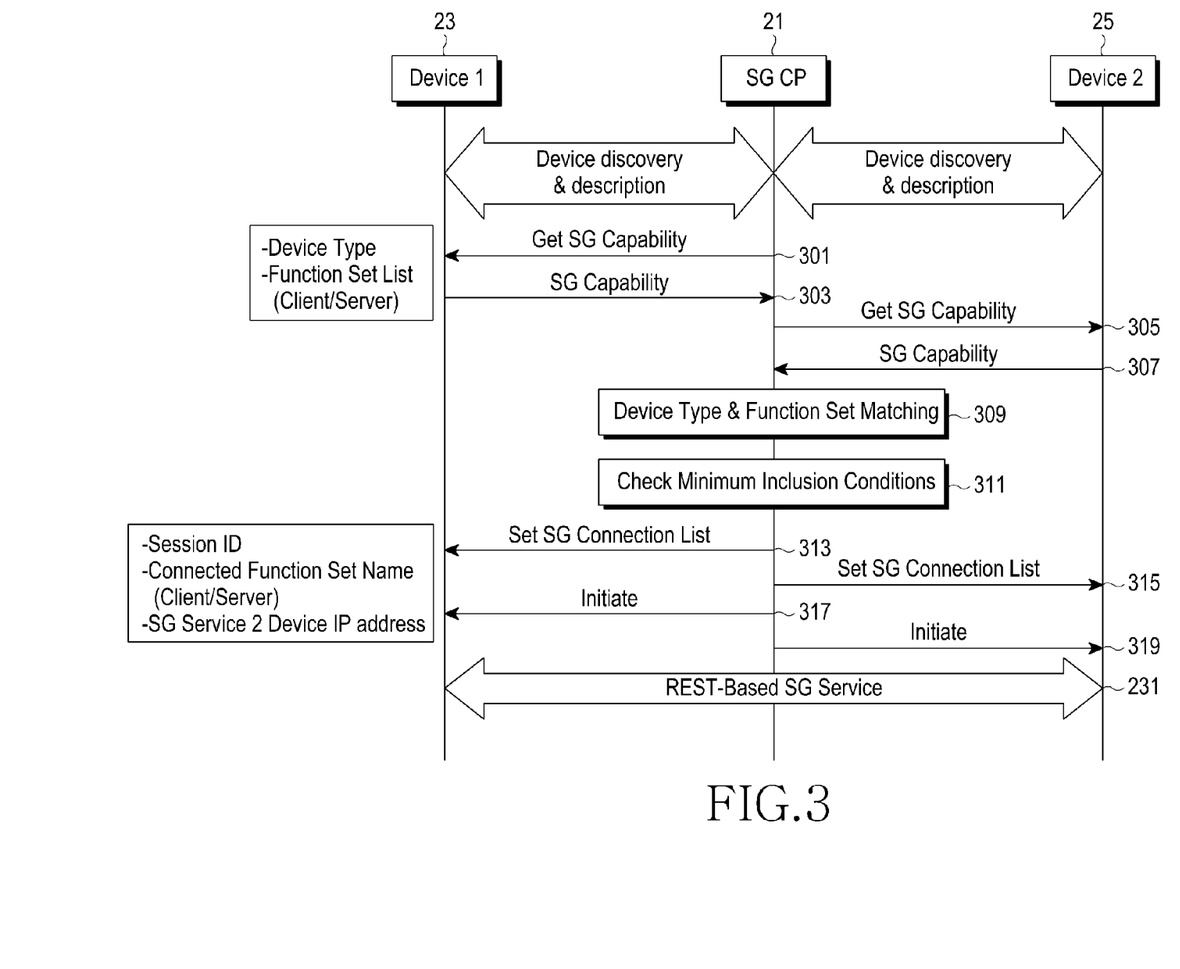
FIG. 3 is a flowchart illustrating a process of exchanging information by applying Zigbee® SEP 2.0 in UPnP according to an embodiment of the present invention.

FIG. 3 is a flowchart illustrating a process of exchanging information by applying Zigbee® SEP 2.0 in UPnP according to an embodiment of the present invention.

Referring to FIG. 3, the SG CP 21 searches for devices having SG services. In FIG. 3, it is assumed that the first device 23 and the second device 25 are discovered. In step 301, the SG CP 21 transmits an SG capability request message with respect to the discovered first device 23 to the discovered first device 23. In step 303, the first device 23, after receiving the SG capability request message transmits its own SG capability information to the SG CP 21. The SG capability information may include a type of a corresponding device and a plurality of function sets that include information about whether the corresponding device functions as a client or a server.

In step 305, the SG CP 21 transmits an SG capability request message with respect to the discovered second device 25 to the discovered second device 25. In step 307, the second device 25 having received the SG capability request message transmits its own SG capability information to the SG CP 21. The SG capability information transmitted by the second device 25 includes a type of the second device 25 and a plurality of function sets which include information about whether the second device 25 functions as a client or a server. The SG CP 21 then determines whether minimum inclusion conditions defined in the Zigbee® SEP 2.0 are satisfied based on the received SG capability information. The minimum inclusion conditions defined in the Zigbee® SEP 2.0 are shown in Table 1 below.

TABLE 1

| Device Type | Function Set |
|---|---|
| In Premises Display | [Client] - Messaging, Pricing, Metering |
| Load Control | [Client] - Demand Response and Load Control (DRLC) |
| Smart Thermostats | [Client] - DRLC |
| Meters | [Server] - Metering |
| Smart Applications | [Client] - DRLC, Price |
| Premises Energy Management Systems | [Client/Server] - DRLC, Price |
| Energy Services Interface | [Server] - Message, Price, DRLC |
| Prepament Terminals | [Client] - Price, Billing |
| Inverters | [Server] - Distributed Energy Resources (DER) |
| Electric Vehicle Supply Equipment (EVSE) | [Client] - PEV, Price, DRLC [Server] - PEV (Plug-In Electric Vehicles) |
| End Use Measurement Device (EUMD) | [Server] - Metering |

If the minimum inclusion conditions defined in the Zigbee® SEP 2.0 are satisfied, the SG CP 21 analyzes the received SG capability information with respect to the first device 23 and the received SG capability information with respect to the second device 25 to check if the received SG capability information include the same function sets in common, and if so, the SG CP 21 performs a matching operation in step 309. In step 311, the SG CP 21 checks the same function sets, which are the minimum inclusion conditions. Even the same function sets may have different functions. For example, even if the first device 23 and the second device 25 include particular function sets in common, the particular function set of the first device 23 may include only a client function and the particular function set of the second device 25 may include both a client function and a server function. The matching process will be described in detail with reference to FIG. 4.

Upon finishing checking the same function sets, the SG CP 21 transmits an SG connection list message to the first device 23 in step 313. In step 315, the SG CP 21 also transmits an SG connection list message to the second device 25. The SG connection list message may include a session ID, a name of a function set of a corresponding device which has gone through the matching process, included client/server information, and an IP address of another device to which the corresponding device is to be connected. Upon completion of transmission of the connection list, the SG CP 21 transmits an initialization message to the first device 23 in step 317. In step 319, the SG CP 21 also transmits the initialization message to the second device 25. The first device 23 and the second device 25 having received the initialization messages perform an initialization operation for performing REST-based HTTP communication based on information included in the received SG connection list messages. Upon completion of the initialization operation of the first device 23 and the second device 25, the SG CP 21 goes to step 321 to perform an SG service between the first device 23 and the second device 25.

Figure 4:
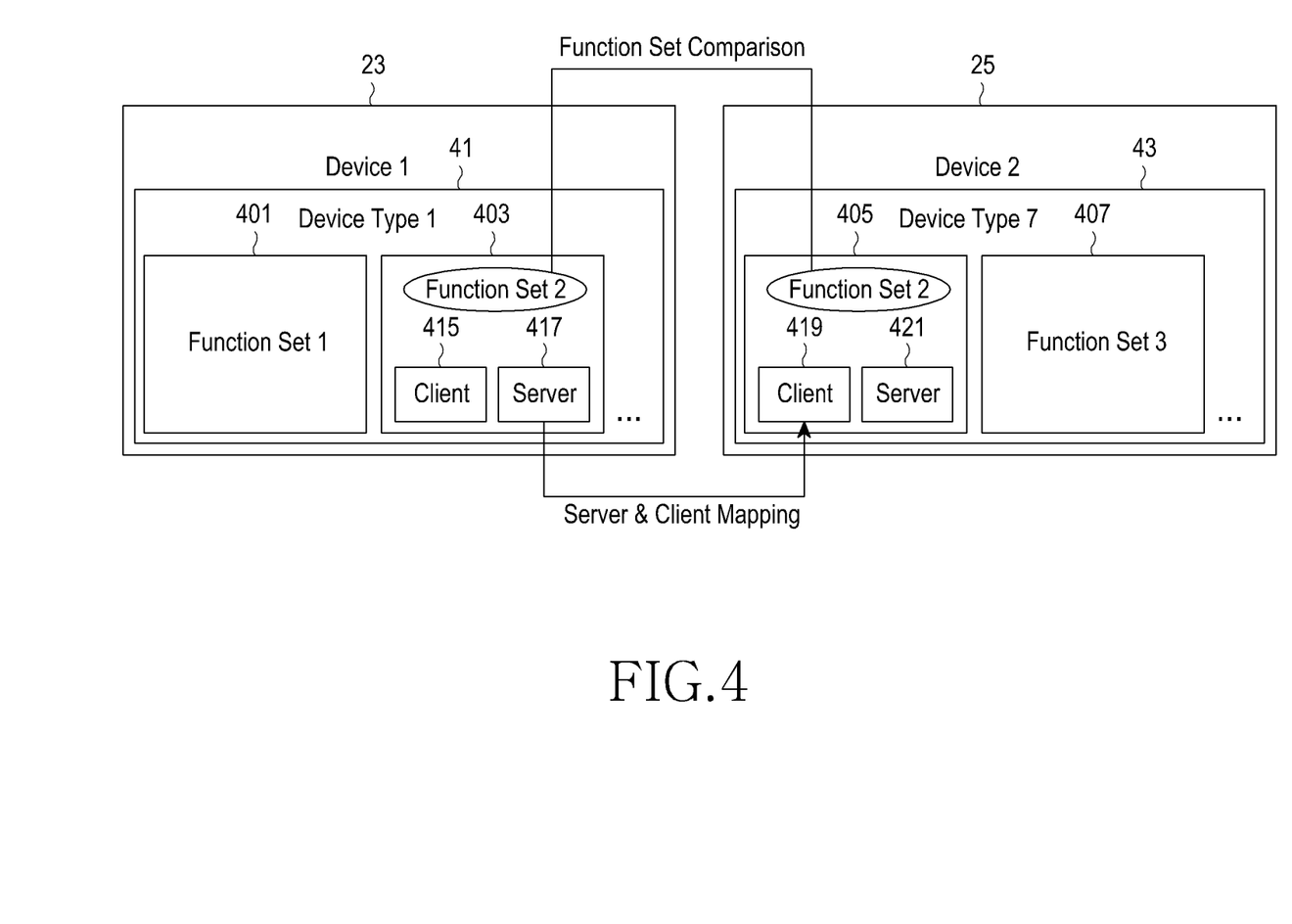
FIG. 4 is a diagram illustrating a matching process based on function set comparison according to an embodiment of the present invention.

FIG. 4 is a diagram illustrating a matching process based on function set comparison according to an embodiment of the present invention.

Referring to FIG. 4, the first device 23 includes a first device type 41 and the second device 25 includes a seventh device type 43. While each device includes one type in FIG. 4, it may also include a plurality of device types.

The first device type 41 included in the first device 23 includes a first function set 401 and a second function set 403, and the seventh device type 43 included in the second device 25 includes a second function set 405 and a third function set 407. Since the second function sets 403 and 405 are included in common in the first device 23 and the second device 25, the SG CP 21 performs a matching operation with respect to the second function sets 403 and 405. The matching operation connects a server module and a client module included in the respective function sets, such that a server module 417 included in the second function set 403 of the first device 23 and a client module 419 included in the second function set 405 of the second device 25 are connected to one another and a client module 415 included in the second function set 403 of the first device 23 and a server module 421 included in the second function set 405 of the second device 25 are connected to one another.

Both a client module and a server module are included in any function set in FIG. 4, only one of them may be included. For example, when the second function set 403 of the first device 23 includes only the server module 417 and the second function set 405 of the second device 25 includes only the client module 419, only unidirectional communication in which the second device 25 requests information from the first device 23 is possible. After the information exchange is ready as shown in FIG. 4, the information exchange occurs via an HTTP request and response as below.

Figure 5:
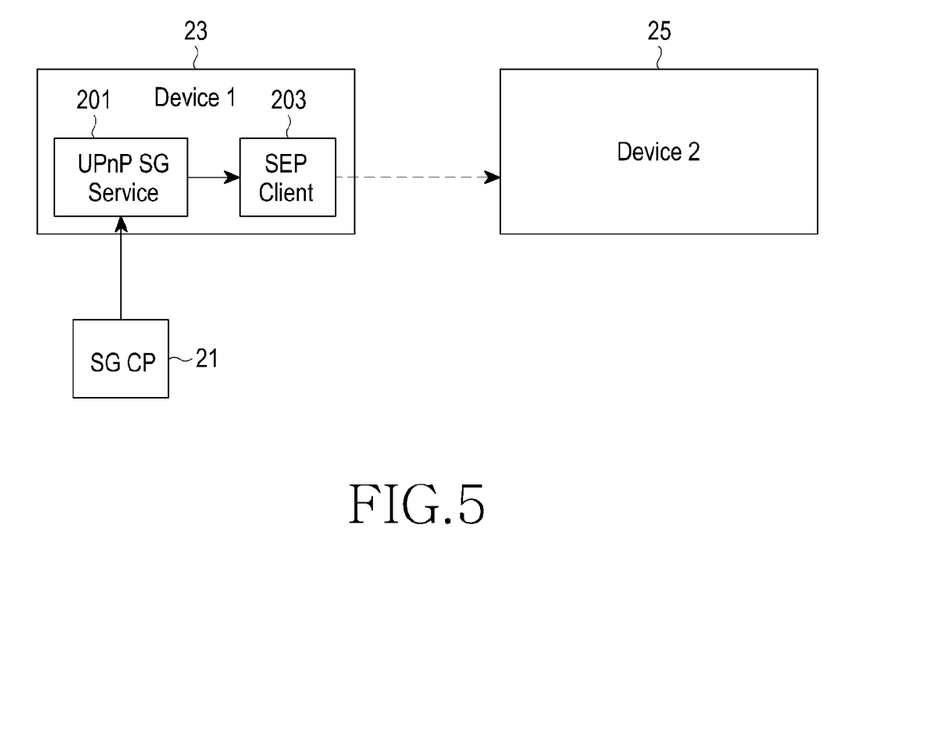
FIGS. 5 through 8 are diagrams illustrating a process of exchanging information by applying Zigbee® SEP 2.0 of a smart grid in UPnP according to an embodiment of the present invention.
Figure 6:
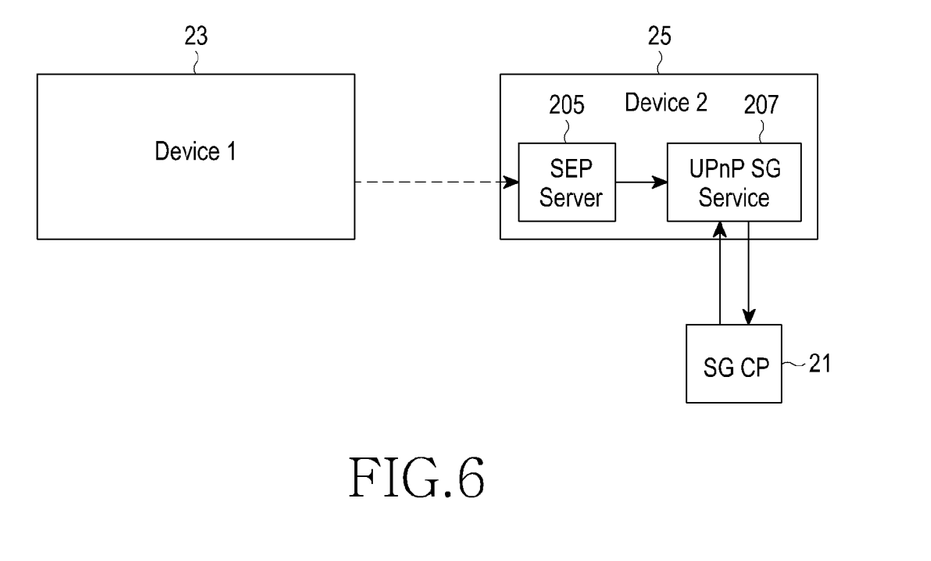
Figure 7:
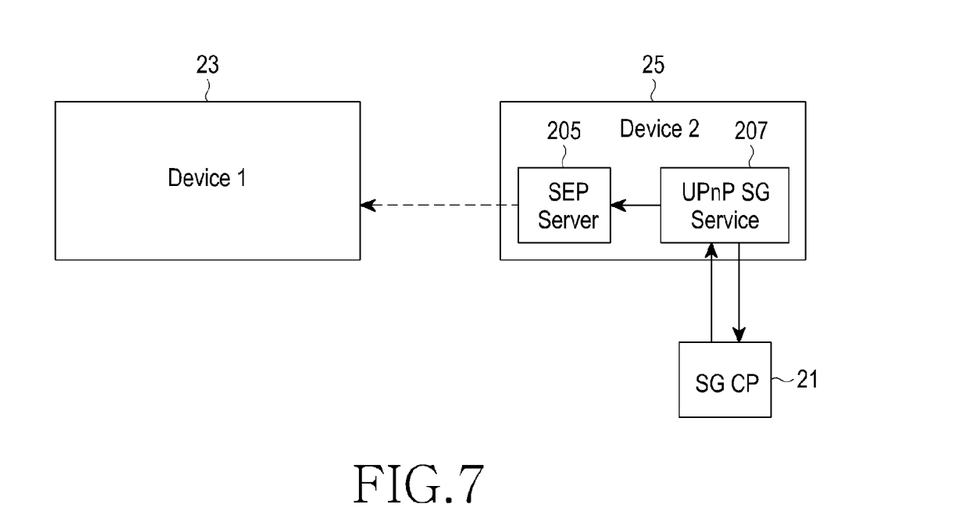
Figure 8:
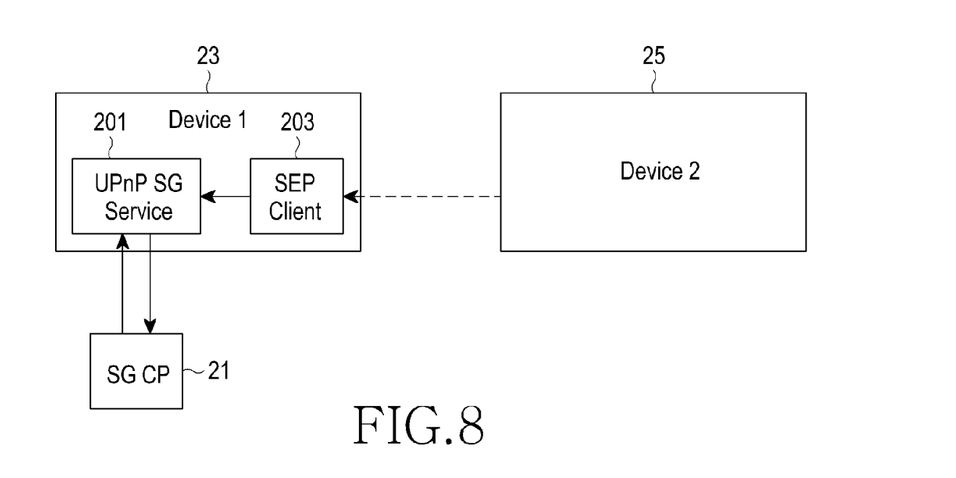

FIGS. 5 through 8 are diagrams showing a process of exchanging information by applying the Zigbee® SEP 2.0 of the smart grid in UPnP according to an embodiment of the present invention. FIGS. 5 and 6 show a process of transmitting an HTTP request message, and FIGS. 7 and 8 show a process of receiving the HTTP request message.

Referring to FIG. 5, the SG CP 21 controls the first device 23 to transmit the HTTP request message to the second device 25. To accomplish this, the SG CP 21 transmits an REST request action message to the first device 23. The SG service module 201 of the first device 23, upon receiving the REST request action message from the SG CP2 1, converts the received REST request action message into an REST request message and forwards it to the SEP client module 203, which then transmits the HTTP request message to the second device 25.

Referring to FIG. 6, the second device 25 receives the HTTP request message from the first device 23 through the SEP server module 205. The received HTTP request message is converted into an event and then forwarded to the SG service module 207. After the SG service module 207 receives the HTTP request message converted into the event, it forwards the HTTP request message converted into the event to the SG CP 21.

The SG CP 21 exchanges event messages with the second device 25 to receive the HTTP request message converted into the event from the second device 25. After the SG CP 21 first transmits an event request message to the second device 25, the second device 25 transmits an event response message to the SG CP 21, converts the HTTP request message from the first device into the event, and transmits the HTTP request message converted into the event to the SG CP 21.

Referring to FIG. 7, the SG CP 21 first controls the second device 25 to transmit an HTTP response message to the first device 23. To this end, the SG CP 21 transmits a REST response action message to the second device 25. The SG service module 207 of the second device 25, upon receiving the REST response action message from the SG CP 21, converts the received REST response action message into an REST response message and forwards it to the SEP client module 205, which then transmits the HTTP request message to the first device 23.

Referring to FIG. 8, the first device 23 receives the HTTP response message from the first device 25 through the SEP server module 205. The received HTTP response message is then converted into an event and forwarded to the SG service module 201. After the SG service module 201 receives the HTTP response message converted into the event, it forwards the HTTP response message converted into the event to the SG CP 21.

Moreover, in FIGS. 7 and 8, after event messages are exchanged between the SG CP 21 and the first device 23, the first device 23 converts the HTTP response message from the second device 25 into the event and forwards the HTTP response message converted into the event to the SG CP 21.

Thus, according to the present invention, by using the Zigbee® SEP 2.0 technology of the SG to the UPnP network, interactive real-time information exchange using the SG is also possible in the UPnP network.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method for exchanging information by using a smart grid (SG), the method comprising:
    transmitting, by an SG control point (CP), an SG capability request message to a first device and a second device;
    receiving SG capability response messages from the first device and the second device;
    determining whether function sets included in the received SG capability response messages from the first device and the second device are the same as one another, wherein the function sets indicate whether the first device and second device are programmed to function as one of a client and a server and includes information relating to at least one function that the first device and the second device are programmed to perform;
    matching function sets of the first device and the second device that are the same as one another; and connecting the first device and the second device to one another.

2. The method of claim 1, wherein the SG capability response message comprises device types, and wherein the device types include function sets.

3. The method of claim 2, wherein the function sets comprise at least one of a client function and a server function of a corresponding device.

4. The method of claim 1, further comprising: determining whether predefined minimum inclusion conditions are satisfied based on the received SG capability response messages.

5. The method of claim 4, wherein the predefined minimum inclusion conditions are minimum inclusion conditions defined in Zigbee® Smart Energy Profile (SEP) 2.0.

6. The method of claim 1, wherein connecting the first device and the second device to one another comprises:
transmitting connection list messages to the first device and the second device;
receiving initialization messages from the first device and the second device, after the first device and the second device have received the connection list messages; and
connecting the first device and the second device to one another based on the connection list messages received by the first device and the second device.

7. The method of claim 6, wherein each of the connection list messages comprises a session ID of a corresponding device, information regarding the function sets that are of the same as one another, and an Internet Protocol (IP) address of another device with which the information exchange is to be performed.

8. The method of claim 1, wherein matching the function sets that are of the same as one another comprises:
connecting a client module of a function set included in the first device with a server module of a function set included in the second device.

9. The method of claim 1, wherein matching the function sets that are the same as one another comprises:
connecting a server module of the function set included in the first device with a client module of the function set included in the second device to determine functions of the first device and the second device as a client or a server.

10. A system for exchanging information by using a smart grid (SG), the system comprising:
a first device and a second device having SG service types; and
an SG control point (CP) for transmitting an SG capability request message to the first device and the second device, receiving SG capability response messages from the first device and the second device, determining whether function sets included in the received SG capability response messages from the first device and the second device are the same as one another, wherein the function sets indicate whether the first device and second device are programmed to function as one of a client and a server and includes information relating to at least one function that the first device and the second device are programmed to perform, matching function sets of the first device and the second device that are the same as one another, and connecting the first device and the second device to one another for the information exchange.

11. The system of claim 10, wherein the SG capability response message comprises device types, and wherein the device types comprise function sets.

12. The system of claim 11, wherein the function sets comprise information indicating that a corresponding device functions as at least one of a client and a server.

13. An apparatus for exchanging information by using a smart grid (SG), the apparatus comprising:
a transmitter for transmitting an SG capability request message to a first device and a second device;
a receiver for receiving SG capability response messages from the first device and the second device;
a controller for determining whether function sets included in the received SG capability response messages from the first device and the second device are the same as one another, wherein the function sets indicate whether the first device and second device are programmed to function as one of a client and a server and includes information relating to at least one function that the first device and the second device are programmed to perform, and matching function sets of the first device and the second device that are the same as one another; and
a connector for connecting the first device and the second device to one another.

14. The apparatus of claim 13, wherein the first device and the second device have the same SG service type.

15. The apparatus of claim 13, wherein the SG capability response message comprises device types, and wherein the device types comprise function sets.

* * * * *